April 16, 1935. T. BROWN 1,997,765
POWER LIFT MEANS FOR TRACTORS AND THE LIKE
Filed Oct. 9, 1933 2 Sheets-Sheet 1
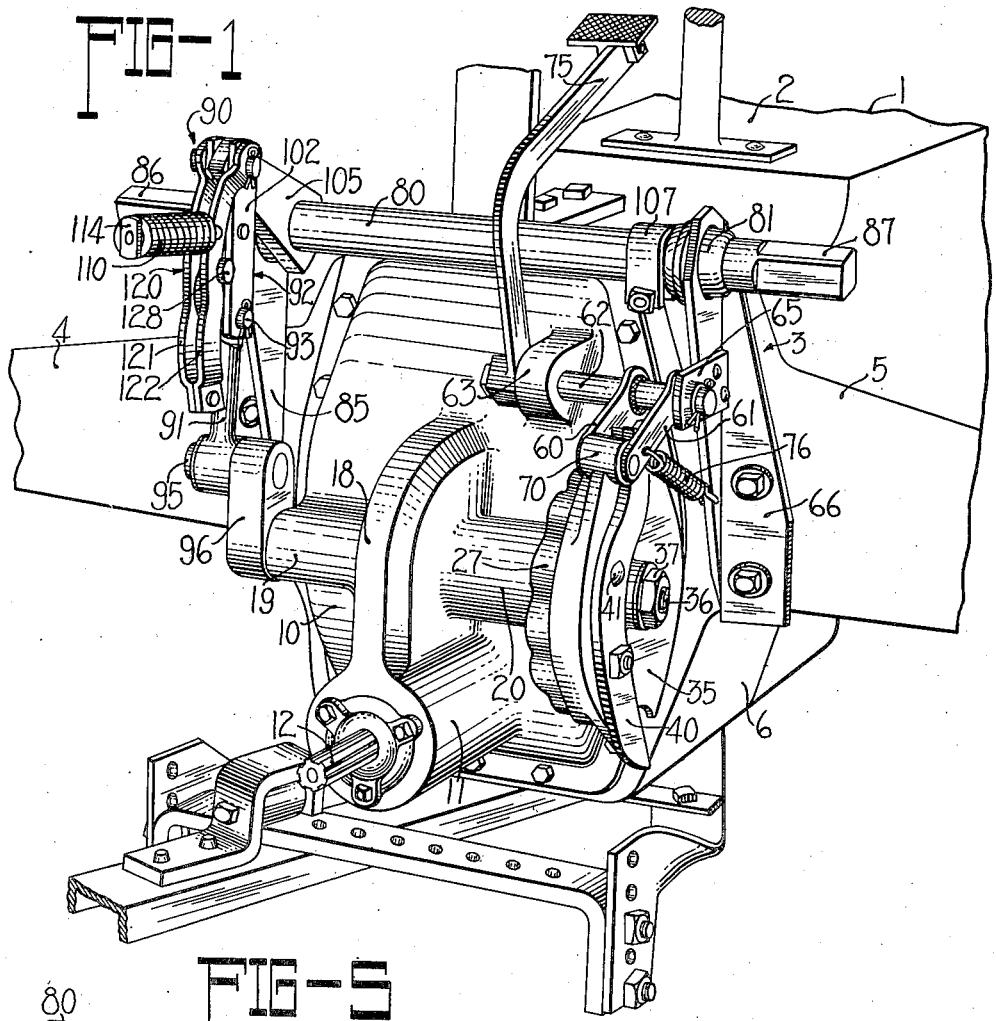
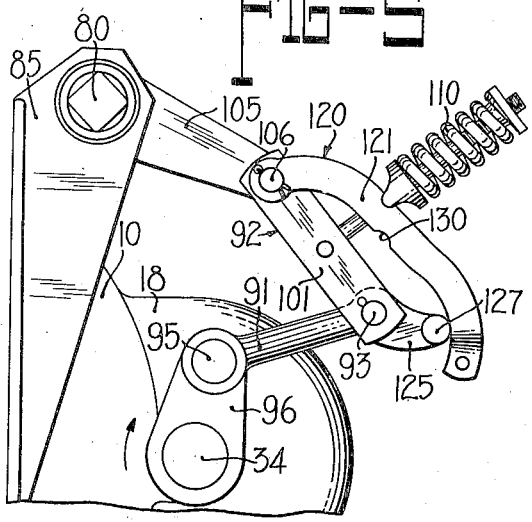
INVENTOR
Theophilus Brown
BY Brown, Jackson, Boettcher & Dienner
ATTORNEYS.

April 16, 1935.   T. BROWN   1,997,765
POWER LIFT MEANS FOR TRACTORS AND THE LIKE
Filed Oct. 9, 1933   2 Sheets-Sheet 2
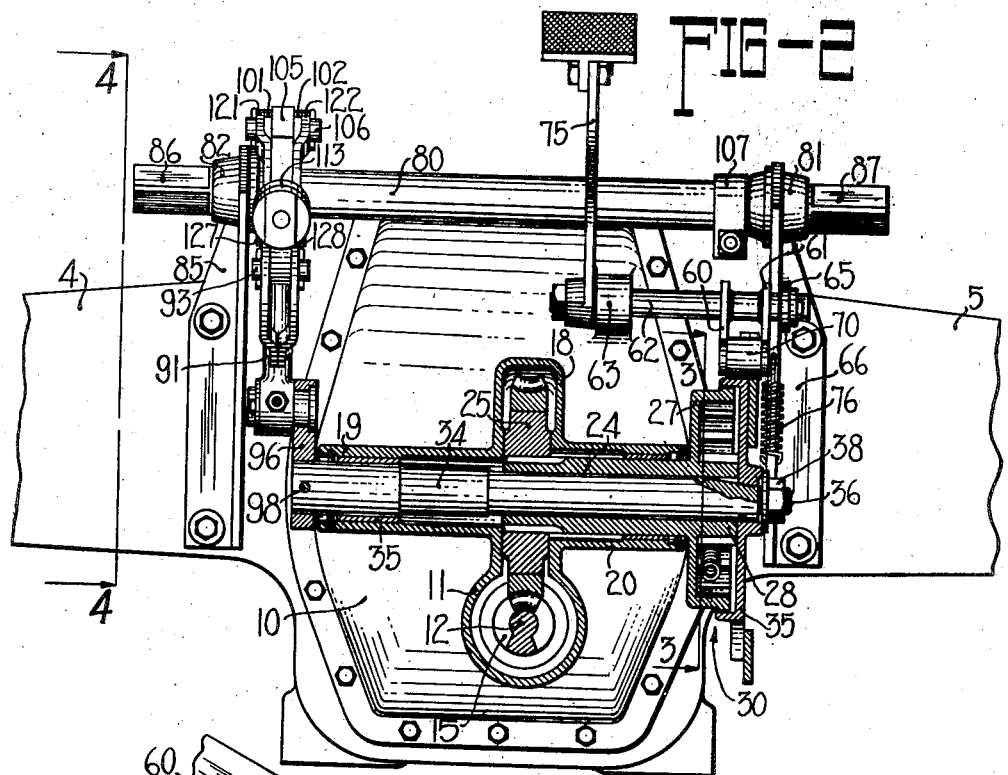

Patented Apr. 16, 1935

1,997,765

UNITED STATES PATENT OFFICE 1,997,765

POWER LIFT MEANS FOR TRACTORS AND THE LIKE

Theophilus Brown, Moline, Ill., assignor to Deere & Company, Moline, Ill., a corporation of Illinois Application October 9, 1933, Serial No. 692,754

14 Claims. (Cl. 97—50)

The present invention relates to improvements in tractors and is particularly concerned with the provision of an improved power lift assembly adapted to derive power from the tractor motor and to utilize the same for operating the raising and lowering means of associated implements and performing other functions requiring the application, either continuously or intermittently, of power under control.

Specifically, one of the principal objects of the present invention is to improve the mounting and support of the various power lift parts to provide a more rugged construction and to distribute the stresses and strains. To this end, the present invention contemplates providing a transversely disposed tubular housing for the driven shaft of the power lift clutch mechanism and to mount the clutch elements outside of the housing and preferably on one side thereof with the lifting crank or other operative connections, adapted to be actuated by the power lift mechanism, connected at the other end of the shaft.

Another important object of the present invention is the provision of simplified means for preventing the driven parts of the clutch mechanism from overrunning the driving parts. This anti-racing feature is of especial importance where the power lift clutch mechanism is utilized for raising and lowering implement parts, such as soil engaging tools and the like. Implements, such as listers and the like, when dropped, fall upon the points of the furrow openers, and as these implements are relatively heavy, often damage is done to the furrow opener parts, especially where the lister is dropped on hard or stony ground. According to the present invention, the driven clutch parts are locked or latched to the driving clutch parts when the clutch is operated so that the driven parts are prevented from rotating in either direction with respect to the driving parts. Thus, when the clutch is tripped to lower an implement, the implement is lowered gradually and the possibility of damage to the furrow opener points is eliminated. The construction of the clutch of the present invention is both sturdy and simple and avoids the complicated latches or other ratchet mechanism employed in previous clutches to prevent racing.

Still further, another object of the present invention is the provision of overload release mechanism between the clutch mechanism and the parts to be operated, or raised or lowered, thereby. According to the present invention, the overload release mechanism is capable of being reset by a subsequent operation of the power lift clutch.

These and other objects and advantages of the present invention will be apparent after a consideration of the following detailed description of the preferred structural embodiment, taken in conjunction with the accompanying drawings illustrating such embodiment.

In the drawings:

Figure 1 is a perspective of a portion of the rear end of a tractor on which my improved power lift mechanism has been mounted;

Figure 2 is a rear elevation of the construction shown in Figure 1, with certain parts broken away;

Figure 3 is an enlarged cross section, taken on the line 3—3 of Figure 2;

Figure 4 is a side view, taken along the line 4—4 of Figure 2; and

Figure 5 is a view similar to Figure 4 but showing the overload release mechanism in tripped or release position.

Referring now to the drawings, the numeral 1 indicates a tractor of more or less conventional construction embodying a casing 2 serving as a frame for the tractor and containing the tractor transmission mechanism and to which is secured a rear axle housing 3 of the banjo type which includes laterally directed housing sections 4 and 5 joined at their inner ends by a banjo section 6 enclosing the differential mechanism for the live axles journaled in the housing sections 4 and 5. Rear axle housings of the type shown are usually provided with a rear opening closed by a cover plate, and according to the principles of the present invention, the cover plate for the rear axle housing is formed so as to provide for the mounting of certain parts of the power lift assembly. The cover plate is indicated in Figure 1 by the reference numeral 10 and is provided with a sleeve 11 formed integrally therewith, extending rearwardly from the lower portion thereof and providing a casing for a power take-off shaft 12 which is adapted to be operatively connected in any manner with the tractor motor, preferably by a connection with certain of the transmission gears enclosed in the casing 2, or the shaft 12 may be connected directly to the end of the main drive worm, as shown in Letters Patent No. 1,640,642, granted to me on August 30, 1927, and in Letters Patent granted to J. H. Wilson, 1,644,765, October 11, 1927. Within the housing 11 the power take-off shaft 12 is provided with a worm 15, best shown in Figure 2, from which power is derived for actuating the power lift clutch and associated structure.

The sleeve 11 is formed integrally with and merges into a central housing section 18 from each side of which extend tubular bearing housings 19 and 20, the bearing housings and the central housing section all being preferably formed integrally with the cover plate 10.

Journaled within the right hand bearing housing 20 is a sleeve 24, best shown in Figure 2, which extends from the central housing section 18 outside the right hand end of the housing section 20, and at its inner end the sleeve 24 carries a worm gear 25 keyed or otherwise secured thereto and arranged to mesh with the worm 15 carried on the power take-off shaft 12. The laterally outer end of the sleeve 24 projects through the bearing housing 20 and has formed integrally with its outer end a drum 27 and a hub 28. The drum 27 forms the constantly rotating element of a power lift clutch, indicated in its entirety by the reference numeral 30, of the operator controlled half-revolution type. That is to say, as long as the power take-off shaft 12 is rotated, the clutch element 27 will also be rotated.

Journaled within the sleeve 24 and within the left hand tubular housing 19 is a transverse shaft 34, bearing means 35 being carried by the housing section 19 for this purpose. The transverse shaft 34 extends laterally beyond the housing 19 at one end and laterally beyond the hub 28 at the other end, as best shown in Figure 2.

The right hand end of the shaft 34 is tapered and is formed to receive the intermittently rotatable plate element 35, this plate element forming the driven member of the half-revolution clutch 30. Preferably, the tapered end of the shaft 34 is provided with splines which engage with companion splines formed in the plate member 35, although other fastening or securing means may be employed if desired. The extreme end 36 of the shaft 34 is threaded and provided with a nut 38 for holding the plate element 35 in position. The half-revolution clutch mechanism proper consists of the driving and driven members 27 and 35 referred to above and suitable operator controlled means for clutching the driven member to the driving member. For this purpose, the driven member 35 carries a throwout dog 40 on the outside thereof and pivotally connected therewith by means of a pivot 41, as best shown in Figure 1. The throwout dog 40 carries a roller 42 which is journaled on a pin 43 fixed to the member 40 and projecting through a slot 44 in the plate member 35. The inner end of the pin 43 is supported and reinforced by a strap 45 and is rigidly connected with both the pin 43 and the pivot 41 whereby, by such construction, the strap 45 is virtually a fixed part of and moves with the dog 40. The length of the slot 44 limits the rocking movement of the dog 40 and strap 45 about the pivot axis 41.

The throwout dog 40 and associated parts are so mounted on the plate member 35 that the strap 45 and roller 42 are arranged in a position between the hub 28 and flange 27 of the driving clutch element, and the strap 45 is curved in a direction to follow the curvature of these parts, as best shown in Figure 3. The flange 27 is provided with a series of internal corrugations 50 and the hub member 28 is provided with a plurality of notches 51 facing outwardly in the direction of the corrugations 50. The roller 42 is adapted in one position to engage the corrugations 50, and in the same position a tooth or projection 55 is adapted to engage one of the notches 51, a spring 56 being provided for urging the throwout dog 40 to a position in which the roller 42 does engage one of the notches 50 and the tooth 55 engages one of the notches 51. Figure 3 shows these parts in disengaged position, in which the roller 42 is free of the corrugations 50 and the tooth 55 is free of the notches 51. The means for holding the throwout dog 40 in this position and against the action of the spring 56 comprises a pair of arms 60 and 61 carried by a shaft 62 supported in an apertured boss 63 and in an apertured plate 65 riveted or otherwise secured to a vertically disposed bracket 66 bolted to the axle housing 3. The arms 60 and 61 are preferably welded or otherwise rigidly secured to the shaft 62 and their radially outer ends are spaced apart to receive a roller 70 journaled on a pin or stud 71 secured to the arms 60 and 61. The roller 70 is adapted to be disposed in a notch 72 formed in a flange portion of the plate member 35, and the notch 72 is so disposed with respect to the throwout dog 40 that, whenever the roller 70 is positioned in the notch 72, the outer end of the throwout dog 40 is engaged and the dog 40 is moved about its pivot 41 to the position shown in Figure 3, which holds the roller 42 and the tooth 55 out of engagement with the flange 27 and hub 28 of the driving clutch element. With the parts in this position, the half-revolution clutch 30 is disengaged. A pedal 75 is secured to one end of the shaft 62 and serves to rock the shaft against the action of the spring 76 which is biased between the flange of the bracket 66 and the arm 61 for withdrawing the roller 70 from the notch 72 and out of engagement with the end of the throwout dog 40.

When the pedal 75 is depressed the roller 70 is rocked out of engagement with the dog 40 and the spring 56 then operates to swing the dog in a position to bring the roller 42 into one of the corrugations 50, and at the same time the tooth 55 enters one of the notches 51. From Figure 3 it will be apparent that there are as many notches 51 as there are corrugations 50. When this engagement is thus established, the plate member 35 will be locked for rotation with the driving flange 27 and hub 28. Normally, the driving member 27, acting through the corrugations 50 and the roller 42 and dog 40, will exert a thrust on the clutch element 35 to cause the same to rotate therewith in the direction of the arrow shown in Figure 3.

Under conditions where, for some reason, the driven member 35 tends to overrun the driving flange 27 and rotate faster than the flange, the tooth 55 being in engagement with one of the notches 51 on the hub 28, which it will be remembered is a fixed part of the member including the flange 27, the member 35 will be prevented from rotating relative to the hub 28. In other words, the provision of the notches 51 and the tooth 55 prevents the member 35 from rotating in a clockwise direction with respect to the flange 27, while the provision of the roller 42 and the corrugations 50 prevent any movement of the plate member 35 in a counterclockwise direction relative to the flange 27.

The clutch mechanism 30 has been referred to as a half-revolution clutch that is to say, it is a clutch mechanism wherein after it has been manually tripped or placed in operation, the clutch is driven for one-half of a revolution and then it automatically stops. This type of clutch is well known, and in order to secure the desired operation through one-half of a revolution, or 180°, the driven member 35 of the clutch 30 is provided with an additional notch or recess 72a diametrically opposite to the notch 72, and likewise the throwout dog 40 is of a length to bring one end thereof adjacent the notch or recess 72a in a relation which corresponds to the relation between the opposite end of the clutch dog 40 and the notch 72. Thus, when the pedal 75 is depressed to raise the roller 70 out of the notch 72, the clutch is actuated until the notch 72a is rotated into a position to receive the roller 70, and then the roller 70 drops into the notch 72a and there bears against that end of the throwout dog 40. The latter then swings about its pivot 41 to disengage the plate member 35 from the driving member 27—28 of the clutch.

Reference has been made above to the fact that the power lift assembly embodied in the present invention is preferably utilized for raising and lowering implements or other operating units. Implements, such as listers, plows, cultivators and the like employ soil engaging tools which are adapted to be raised and lowered into and out of inoperative position. To this end, a transversely disposed rock shaft 80 is provided and is preferably supported directly on the tractor although, if desired, the shaft 80 may be journaled by bearing means carried by the cover plate 10. However, as best shown in Figures 1 and 2, the shaft 80 is supported in bearings 81 and 82, the former being supported in an opening at the upper end of the bracket 66 and the bearing 82 is supported in a similar bracket 85 bolted or otherwise secured to the tubular drive housing 4. Both ends of the rock shaft 80 are squared, as at 86 and 87 to receive cranks, gears, and other members by which the rocking movement of the shaft 80 is utilized to perform the desired functions. The rock shaft 80 is mounted above the power lift clutch mechanism and is also disposed above the tubular axle housings 4 and 5 so that implement units both at the front and at the rear of the tractor 1 may be connected with the rock shaft 80.

For actuating the rock shaft 80, the same is connected with the driven parts of the clutch mechanism 30. According to the principles of the present invention, such connections include an overload release mechanism to protect the clutch structure and associated parts in the event that the implement or other operating units are subjected to an overload. For example, if the implement associated with the tractor is a plow or the like and if the furrow opener thereof happens to be hooked underneath a large root or stone at the time it is desired to raise the furrow opener out of ground engaging position, the overload release mechanism will yield when the power lift clutch is actuated in order to protect the clutch mechanism which, if no overload release mechanism were provided, might be seriously damaged under such conditions.

The overload release mechanism is interposed as an operative connection between the transverse shaft 34, which is keyed to the driven plate member 35 of the half-revolution clutch mechanism 30, and the rock shaft 80. The overload release mechanism is indicated in Figure 1 as an entirety by the reference numeral 90 and comprises a pair of links 91 and 92 pivotally connected together, as by a pivot pin 93 or the equivalent, and the link 91 is journaled at its lower end on a pin 95 carried on a power lift crank 96 secured to the left hand end of the transverse shaft 34, as by a pin 98 (see Figure 2) or the equivalent. The link 92 consists of a pair of interconnected members 101 and 102, and the upper ends of the link members 101 and 102 embrace and are pivotally connected to the outer end of an arm 105 rigidly secured to the rock shaft 80 near one end thereof and adjacent the bearing means 82 and the supporting bracket 85, as best shown in Figure 2, as by a pivot pin 106. The arm 105 and a collar 107 at the other end of the rock shaft 80 serve to maintain the latter in position in the supporting brackets 66 and 85.

The pivotally connected links 91 and 92 are caused to normally act as a rigid connection between the crank arm 96 and the crank arm 105 for the transmission of thrusts or compressive stresses therebetween. The means for causing the links 91 and 92 to act as a rigid link connection comprises biased means carried by one of the links and acting against the other link to hold both links in substantially aligned relation as shown in Figure 4. The biased means comprises a spring 110 carried on an eye bolt 111 pivotally connected with the link 92 by a pin 112 and provided with a threaded section 113 which receives a nut 114 against which the spring 110 bears. The opposite end of the spring 110 acts against an abutment member 116 having rocker sections 117 and, in turn, bearing against an arm member 120 comprising a pair of interconnected straps 121 and 122 pivoted at the upper ends on the pin 106.

The link member 91 is provided with an extension arm 125 which terminates in a pair of laterally directed oppositely disposed cylindrical lugs 127 and 128. The extension 125 forms a rigid part of the link 91 and swings therewith when the link 91 turns about the axis 93 with respect to the companion link 92. When the links 91 and 92 are arranged as shown in Figure 4, the lugs 127 and 128 are so positioned that they engage the edges of the link members 101 and 102, as best shown in Figures 1 and 4, being held in that position under the influence of the spring 110 bearing against the links 121 and 122, each of which is provided with a notch 130 to receive the lugs 127 and 128. In this position, the pivots 95, 93, and 106 will be in nearly a straight line, and the effect of the spring 110 in holding the links 91 and 92 in this position will be at a maximum due to the fact that the arm extension 125 is disposed alongside the upper link member 92 so that the effective moment arm of the biasing force applied through the links 121 and 122 against the lugs 127 and 128 is a maximum. Thus, a substantially rigid link connection under all normal lifting loads is provided between the crank arm 96 and the crank arm 105.

Whenever the clutch pedal 75 is depressed to raise the roller 70 out of its notch in the plate member 35 and the clutch mechanism actuated thereby, the power lift crank 96 is rotated in the direction of the arrow shown in Figures 4 and 5, Figure 4 showing the parts after the power lift crank 96 has been rotated through substantially a half-revolution and has rocked the arm 105 upwardly. If, for example, the rock shaft 80 is subjected to an abnormal overload, as when a plow to be lifted becomes hooked underneath a large root or stone, the turning effort of the crank arm 96 will, instead of swinging the arm 105 upwardly, swing the link member 91 about the pivot 93, thus swinging the arm extension 125 outwardly and against the tension of the spring 110 and the arm member 120. Thus the overload release means will be tripped and will permit the clutch 30 to actuate without rocking the shaft 80, and as the arm extension 125 swings about the pivot 93 and against the tension of the spring 110, the links assume the position shown in Figure 5. That is to say, an overload on the clutch is sufficient to cause the lugs 127 and 128 to be cammed out of the recesses 130 in the link or strap members 121 and 122.

It is to be noted that after the lugs 127 and 128 are forced out of the recesses 130, and the arm extension 125 has swung to an appreciable angle, the effect of the biased spring means 110, 120 in resisting the pivotal swinging of the link member 91 is materially reduced. It will also be noted that as soon as the arm extension 125 swings past what might be termed a dead center position with respect to the arm 120, the effect of the spring 110 is to aid in swinging the links 91 and 92 to their folded or retracted position. In the extended position of the links 91 and 92, as shown in Figure 4, the connecting means acts as a substantially rigid unit. In order, however, to minimize the effect of the spring 110 in swinging the link 91 after the dead center position has been reached, the outer or free ends of the links 121 and 122 are formed to have a curvature of a radius substantially equal to the length of the arm extension 125. As will be apparent, the curvature of the free ends of the links 121 and 122 determine whether or not the spring means 110 continues to resist the folding movement of the links 91 and 92, or whether during the latter part of the movement the effect of the spring means 110 is to aid the folding of the links 91 and 92.

During the time in which the clutch 30 completes its cycle of operation after the lugs 127 and 128 have been forced out of the recesses 130, the lugs slide along the curved portion of the arm 120, thus holding the spring 110 compressed to the degree necessary to cam the lugs out of the recesses 130.

After the rigid connection established by the links 91 and 92 in their position shown in Figure 4 has been broken by or under the influence of an abnormal load, the release mechanism 90 can be reset or restored to original position by merely operating the power lift clutch 30 a second time, whereupon the parts of the spring release mechanism will again assume the position shown in Figure 4. During this resetting operation, referring now to Figure 5, the crank arm 96 swings downwardly and to the right through a substantially half-revolution, swinging the link member 91 in a counterclockwise direction as viewed in Figure 5 about the pivot 93, thus sliding the lugs 127 and 128 along the arm 120 toward the pivot 106 until the lugs 127 and 128 again rest in the recesses 130. Thus, the arcuate shaped ends of the arm 120 function as a track to guide the lugs 127 and 128 back into their locked position in the recesses 130.

It is important to note that all of the spring relief mechanism is formed on or carried by the links 91 and 92 themselves and no casing or other supporting means for any of the overload release mechanism is necessary.

While I have described above the preferred structure in which the principles of the present invention have been embodied, it will be apparent that my invention is not to be limited to the specific details both shown and described above, but that, in fact, widely different means may be employed in the practice of the broader aspects of my invention.

What I claim, therefore, and desire to secure by Letters Patent is:

1. Power lift mechanism for tractors and the like comprising a housing adapted to be secured to the tractor and including a transversely disposed bearing portion, a transverse shaft journaled in said portion, means for driving said shaft including half-revolution clutch mechanism carried near one end of said shaft, and a power lift crank carried near the other end of said shaft.

2. Power lift mechanism for tractors and the like comprising a housing adapted to be secured to the tractor and including a transversely disposed bearing housing portion, a transverse shaft journaled therein, means for driving said shaft including a half-revolution clutch mechanism carried at one end of said shaft and disposed outside said bearing housing portion, and a power lift crank carried at the other end of said shaft and also disposed outside of said housing portion.

3. Power lift mechanism for tractors and the like comprising a member adapted to be secured to the tractor and including a transversely disposed bearing housing portion having a central enlarged section, a transverse shaft journaled in said bearing housing portion, means for driving said shaft including a sleeve journaled in one end of said housing portion and extending from the enlarged section thereof laterally outwardly, driving means carried by the laterally inner end of said sleeve and half-revolution clutch mechanism disposed near the other end of said sleeve and operatively connected with said shaft near one end thereof, and power lift connections arranged to be driven from the other end of said shaft.

4. Power lift mechanism for tractors and the like comprising a member adapted to be secured to the tractor and including a transversely disposed bearing housing, a transverse shaft journaled therein, means for driving said shaft including a half-revolution clutch mechanism carried at one end of the shaft, power lift connections driven by the other end of said shaft, brackets carried by the tractor and spaced laterally adjacent the ends of said transverse shaft, a rock shaft journaled in said brackets, and means connecting said rock shaft with said power lift connections.

5. Power lift mechanism for tractors and the like comprising a transversely disposed bearing housing carried by the tractor, a shaft journaled in said housing, means for driving said shaft including a half-revolution clutch mechanism arranged at one end of said shaft, driven connections arranged at the other end of said shaft and adapted to be actuated thereby, laterally spaced brackets carried by the tractor and arranged adjacent the ends of said shafts, a transversely disposed rock shaft journaled in said brackets, means carried by the bracket adjacent the half-revolution clutch for controlling the operation of said clutch, and means for driving said rock shaft from said connections.

6. Power lift mechanism for tractors and the like comprising a centrally disposed housing member including a longitudinally arranged shaft adapted to be driven by the tractor, tubular extensions directed laterally outwardly from said central housing, a transversely disposed shaft journaled in said extensions, means for driving said transverse shaft from the longitudinal shaft including a half-revolution clutch mechanism disposed at the end of the associated tubular extension and means within the central housing for driving said clutch mechanism, means connecting said clutch mechanism with said shaft, and operative connections at the other end of the transverse shaft and driven thereby whenever said clutch mechanism is actuated.

7. A power lift comprising a tubular housing, a sleeve in said housing extending outwardly beyond one end of said housing, driving means within said housing for continuously rotating said sleeve, a half-revolution clutch element on the outer end of said sleeve, a shaft journaled in said sleeve, one end of said shaft extending outwardly beyond the outer end of said sleeve and having a companion clutch element fixed thereon, means carried by said companion clutch element for optional engagement with said first clutch element to cause the two clutch elements to rotate in unison, the other end of said shaft extending outwardly through the opposite end of said housing, and a lifting crank fixed on the other end of said shaft.

8. Power lift mechanism for tractors and the like comprising a power take-off connection driven therefrom, means to be operated by said power take-off connection, and a spring relief mechanism interposed between said means and said power take-off connection and including a pair of pivotally connected links and yieldable means carried by one link and reacting against the other link to prevent the transmission of abnormal loads from said power take-off connection to said first named means.

9. Power lift mechanism for tractors and the like comprising a power take-off connection driven therefrom, means to be operated by said power take-off connection, and a spring relief mechanism interposed between said means and said power take-off connection and including a pair of links pivotally connected together and spring biased means carried by one of said links and reacting against the other to hold said links in substantially rigid relation for the transmission of thrust forces from said power take-off connection to said means.

10. Power lift mechanism for tractors and the like comprising a power take-off connection driven therefrom, means to be operated by said power take-off connection, and resettable spring relief mechanism interposed between said means and said power take-off connection and including a pair of links pivotally connected together, one of said links including an arm portion swingable about the axis of pivotal connection of said links from one side of said axis to the other, and resilient means reacting against the other of said links and bearing against said arm to yieldingly resist any pivotal movement of either link with respect to the other.

11. An overload release mechanism comprising a pair of pivotally connected links, an extension on one of said links adapted to bear against the other link in one relative position of the links, and spring means carried by said one link and arranged to react against said extension on the other link for yieldingly resisting relative movement between the links.

12. An overload release mechanism comprising a pair of pivotally connected links, one of said links having a portion engaging the other link to limit the swinging movement of one link with respect to the other in one direction and to determine the normal position of said links, an arm pivoted to one of said links and having a yielding connection with the other link and bearing against one of said links to yieldingly hold said links in said normal position.

13. An overload release mechanism comprising a pair of pivotally connected links, an extension on one link adapted to bear against the other link when said links are disposed in nearly a straight line, an arm pivoted to one of said links and bearing against said extension, and spring means carried by one of said links and acting against said arm to yieldingly urge said arm against said extension, whereby said links are yieldingly held in said nearly straight line position and are capable of transmitting compression stresses up to a certain maximum.

14. An overload release mechanism comprising a pair of pivotally connected links, an extension on one link adapted to bear against the other link when said links are disposed in nearly a straight line, an arm pivoted to one of said links and bearing against said extension, and spring means carried by one of said links and acting against said arm to yieldingly urge said arm against said extension, whereby said links are yieldingly held in said nearly straight line position and are capable of transmitting compression stresses up to a certain maximum, a recess in said arm positioned to receive the end of said extension, and a guideway on said arm for receiving said extension when said links are caused to move out of said nearly straight line position by the application of an abnormal compression stress greater than said certain maximum, said guideway functioning to guide said extension back into said recess when said abnormal stress is removed.

THEOPHILUS BROWN.